May 23, 1933.  E. WILDHABER  1,910,730

METHOD OF AND DEVICE FOR FORMING CUTTING TOOLS

Filed March 6, 1930  5 Sheets-Sheet 1

INVENTOR

Ernest Wildhaber

May 23, 1933. E. WILDHABER 1,910,730
METHOD OF AND DEVICE FOR FORMING CUTTING TOOLS
Filed March 6, 1930 5 Sheets-Sheet 2
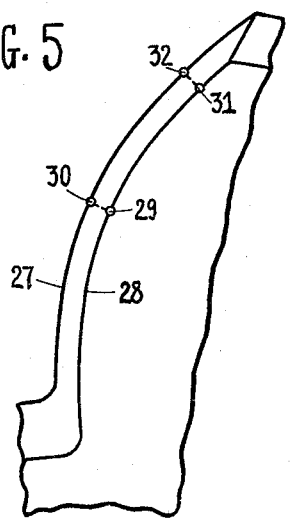
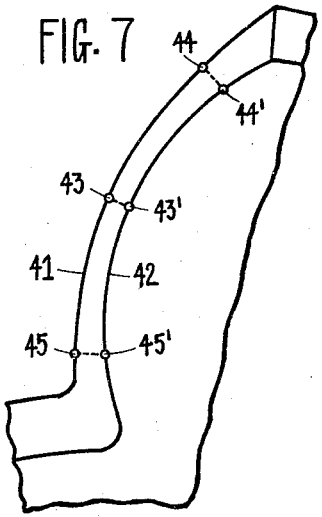
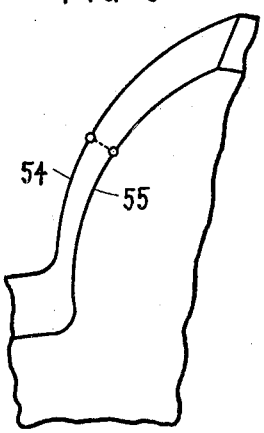
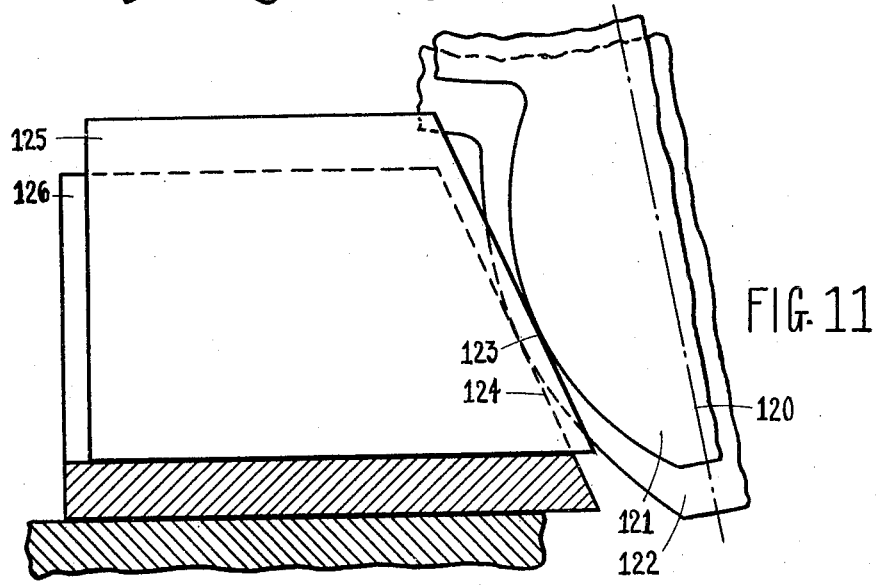
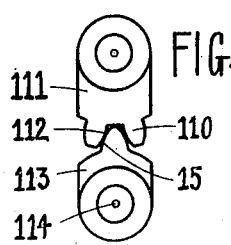
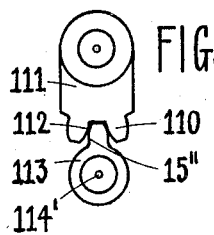
INVENTOR
Ernest Wildhaber

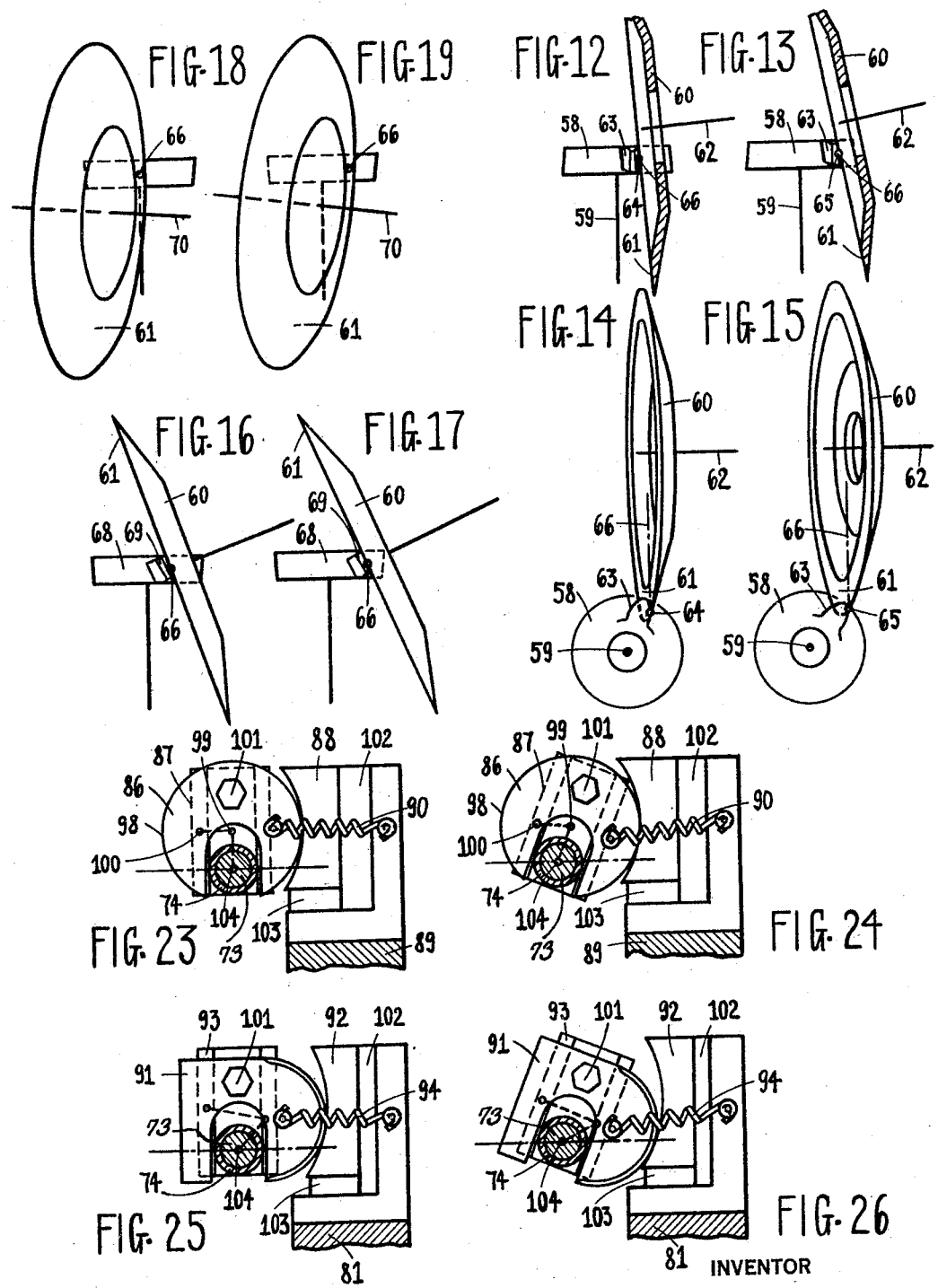

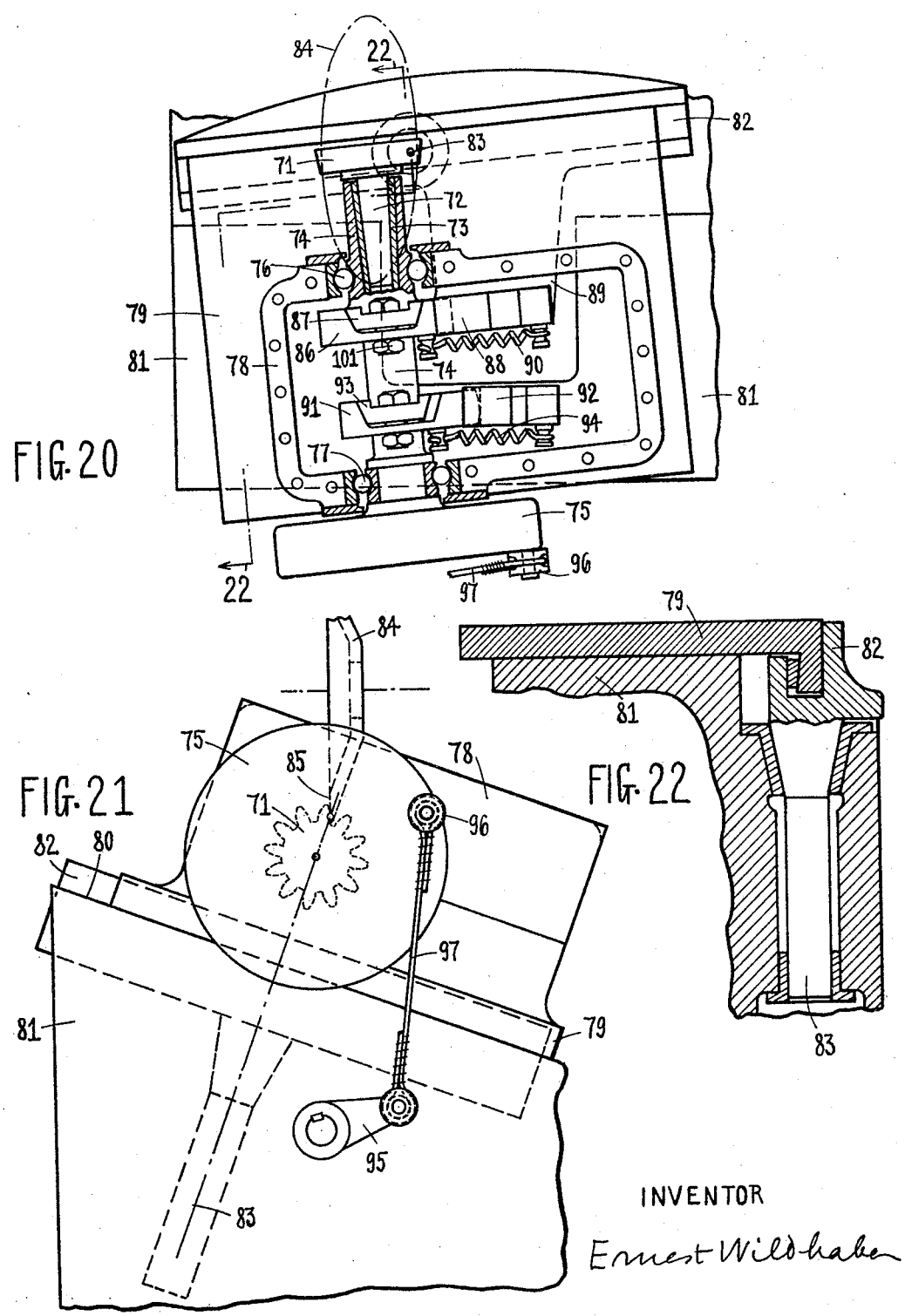

May 23, 1933. E. WILDHABER 1,910,730
METHOD OF AND DEVICE FOR FORMING CUTTING TOOLS
Filed March 6, 1930 5 Sheets-Sheet 5
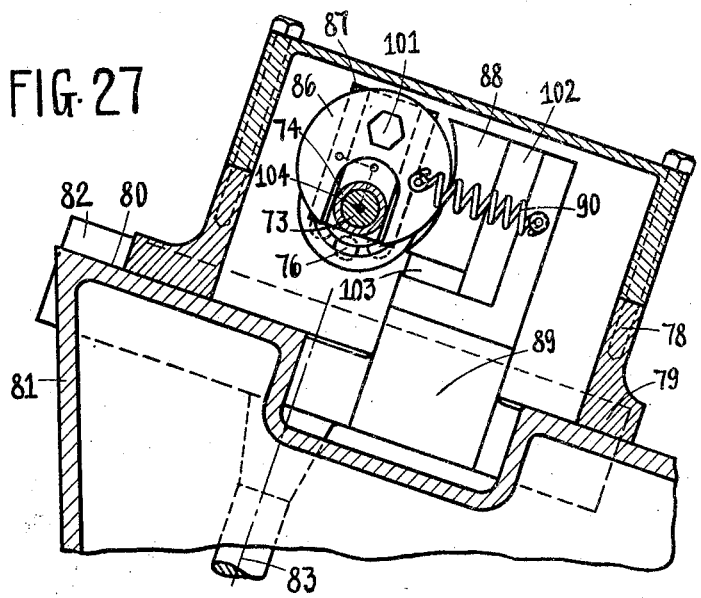
INVENTOR
Ernest Wildhaber Patented May 23, 1933

1,910,730

UNITED STATES PATENT OFFICE

ERNEST WILDHABER, OF ROCHESTER, NEW YORK

METHOD OF AND DEVICE FOR FORMING CUTTING TOOLS

Application filed March 6, 1930. Serial No. 433,731.

The present invention relates to a method of and device for forming cutting tools, and particularly to forming tools for generating non involute gears and gear shaped articles. Tools of the character particularly referred to are sometimes called fellows cutters. They have a general form of a pinion provided with straight or helical teeth and are suited to generate gears and gear shaped articles in a process whereby the tool and the blank roll on each other in the manner of intermeshing gears. The tools may be used either as reciprocatory tools, for reciprocation in a straight or helical path directed along the axis of the tool, or also as rotary tools. The latter use applies especially to processes for cutting threads, worms and the like.

While the present invention is intended particularly to the above said type of generating tools, it is applicable in its broader aspect also to other generating tools, which generate profiles other than their own, as will be evident from the specification.

One object of the present invention is to provide an accurate and efficient method of and means for forming cutting tools of the above said character, which are adapted to produce non involute gears and gear shaped articles, and suited to turn out a constant product throughout their life.

A further object is to provide a method of and means for accurately grinding or abrading relieved side surfaces of novel form as described in my companion application entitled "Cutting tool for generating non involute gears and gear shaped articles", filed March 6, 1930, Serial No. 433,-732.

Another aim in view is to provide an accurate and efficient method of and means for forming and finishing by abrasion relieved side surfaces of generating cutters, whose relieved side surfaces contain tangential planes of changing inclination to the cutter axis, and to devise a method of forming said side surfaces with an abrasive wheel of simple form and especially with an abrasive wheel having a plane working surface.

A further purpose of the present invention is to devise simple means which can be accurately produced, for controlling the shape of relieved side surfaces of generating cutters, said side surfaces having tangential planes of changing inclination with respect to the axis of a cutter.

Another object is to devise adjustable means for controlling the shape of the above said relieved side surfaces, so that said means may be used for a variety of different side surfaces.

Furthermore it is an aim of the present invention to devise means for controlling one profile of a relieved side surface of the aforesaid character, and to devise further means for controlling the angular relation between the tool axis and the axis of an abrading wheel.

It is also an object of the present invention to provide cam means for controlling the angular relation between the axis of a tool blank and the axis of an abrading wheel, and particularly cam means having circular profiles, or symmetrical profiles.

A further purpose is to provide cam means for controlling the angular relation between the axis of a tool blank and the axis of an abrading wheel, and other cam means for controlling the translatory motion of said tool blank relatively to said abrading wheel. Another aim is to control the shape of a relieved side surface with two cams mounted coaxially with a tool blank.

Other objects will appear in the course of the specification and from recital of the appended claims.

In explaining the present invention, reference is made to the accompanying drawings, in which.

Fig. 5 is a view of a portion of a cutting tooth of a tool, the view being taken in the direction of the tool axis and illustrating the profiles of a relief side surface in two planes perpendicular to said tool axis. Fig. 5 illustrates a delivered side surface obtainable in a process in which a tool blank and a plane faced abrasive wheel are moved relatively to each other while the axis of said tool blank and the axis of said abrasive wheel are maintained at a constant angular relation to each other.

Figures 6, 8:
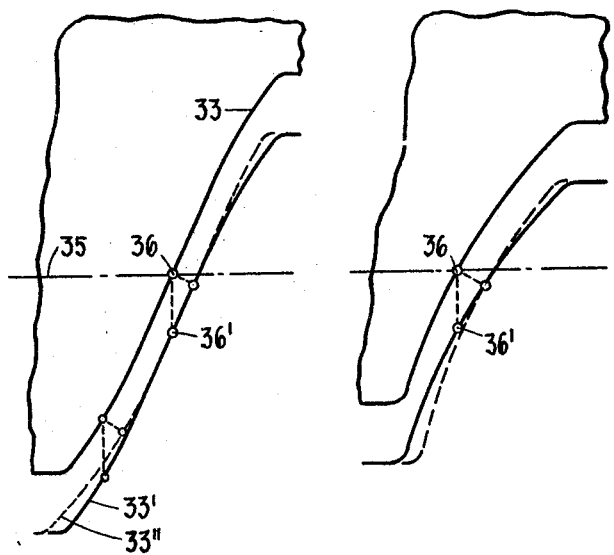

Fig. 6 is a diagram illustrative of the error of a tool of the character referred to in Fig. 5.

Fig. 7 is a view similar to Fig. 5 and illustrative of a preferred form of tool, which is preferably manufactured in accordance with the present invention.

Fig. 8 is a diagram illustrative of the error of another tool ground in the manner explained with respect to Fig. 5.

Fig. 9 is a view similar to Fig. 7 illustrative of a preferred form of another tool, having a different cutting profile.

Fig. 10 and Fig. 10a are diagrams of a way of experimentally determining information desired for forming cutting tools in accordance with the present invention.

Fig. 11 is a diagram explanatory of a way of experimentally determining further information desired for forming tools.

Fig. 12 and Fig. 13 are diagrammatic plan views of a cutter and an abrasive wheel, illustrative of two different relative positions. Fig. 12 illustrates a position in which abrasive contact is made at the central portion of a relieved side surface of the cutter. Fig. 13 illustrates a position in which abrasive contact is made at the outward end of a relieved side surface.

Fig. 14 and Fig. 15 are front elevational views of diagrammatic nature, corresponding to Fig. 12 and Fig. 13 respectively.

Fig. 16 and Fig. 17 are diagrammatic plan views similar to Fig. 12 and Fig. 13 and illustrative of a cutter containing cutting teeth of substantially helical form.

Fig. 18 and Fig. 19 are diagrammatic plan views similar to Fig. 12 and Fig. 13 and illustrative of slightly modified relative positions between a cutter and an abrasive wheel.

Fig. 20 is a plan view of the essential parts of a device constructed in accordance with the present invention, for forming cutting tools, the most obvious known elements being omitted.

Fig. 21 is a front elevational view of the device also illustrated in Fig. 20.

Fig. 22 is a section along lines 22—22 of Fig. 20.

Fig. 23 and Fig. 24 are diagrammatic front elevational views of a cam device used in the machine illustrated in Fig. 20 to Fig. 22, illustrative of two different positions of said cam device.

Fig. 25 and Fig. 26 are diagrammatic front elevational views of another cam device used in the machine illustrated in Fig. 20 to Fig. 22, also illustrative of two positions of said device.

Fig. 27 is a sectional view taken at right angles to shaft 74, Fig. 20, immediately in front of cam 86, and looked at from the front.

Figure 1:
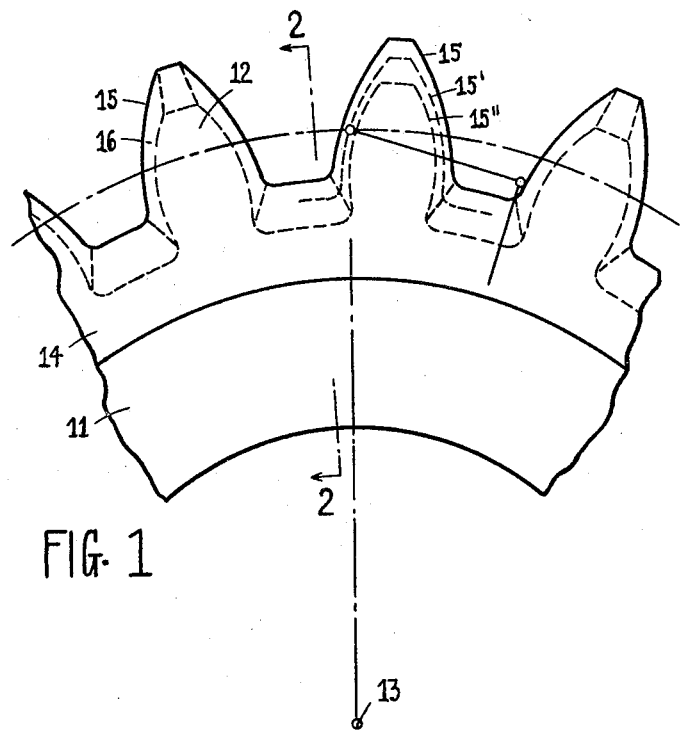
Fig. 1 is a partial view of a cutting tool, such as may be produced with the method of the present invention, said view being taken in the direction of the tool axis.
Figure 2:
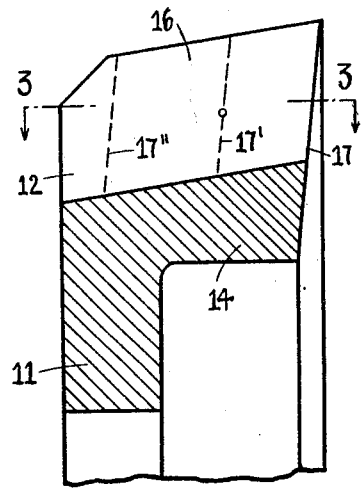
Fig. 2 is an axial section along lines 2—2 of Fig. 1.
Figure 3:
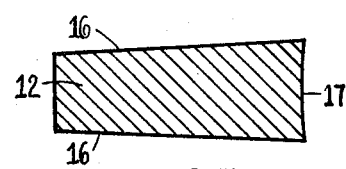
Fig. 3 is a section of a cutting tooth, along lines 3—3 of Fig. 2.

In Fig. 1, Fig. 2 and Fig. 3, numeral 11 denotes a cutting tool having cutting teeth 12 arranged about an axis 13 and projecting from a round body portion 14. Convex cutting edges 15 are formed on relieved side surfaces 16 of the cutting teeth, as the intersection lines of said side surfaces with cutting faces 17.

Figure 4:
Fig. 4 is a section similar to Fig. 3 of a cutting tooth of modified form.

In the illustrated instance the cutting faces lie in a conical surface. The cutting faces may however also have other forms, such as for instance the one indicated in Fig. 4 at 18. The cutting tool is resharpened, by regrinding the cutting faces, as well known. Cutting faces such as 17' and 17" (Fig. 2) are then formed at different times on the tool.

The cutting edges 15', 15", which correspond to cutting faces 17', 17", are indicated in dotted lines in Fig. 1. They are seen to be curves whose position as well as whose form changes. The cutting edges 15, 15', 15", are all contained on a relieved side surface, and the latter must be so shaped as to contain the desired forms of cutting edges.

The present invention deals particularly with the accurate production by abrasion of relieved side surfaces (16).

Hitherto relieved side surfaces of the character referred to have been produced with a plane faced abrasive wheel, by providing motion between a tool blank and an abrasive wheel, while maintaining a constant angular relation between the axis of said tool and the axis of the abrasive wheel. In this general manner relieved side surfaces of the character illustrated in Fig. 5 may be obtained. It can be demonstrated with the known methods of mathematics that the profiles 27, 28 in planes perpendicular to the cutter axis are always equidistant curves, when produced in the aforesaid way. In other words, in a view lengthwise of the cutter axis, each point of profile 28 has the same normal distance from profile 27. For instance distance 29—30 is equal to distance 31—32 or to any other distance measured on the profile normals.

Relieved side surfaces of the aforesaid character furnish cutting edges which are substantially also equidistant curves and which are similar to profiles 27, 28. Their error is illustrated in Fig. 6, which by way of example, illustrates a (non involute) rack profile 33, such as may be obtained with a cutting profile of the general character of profile 27 of Fig. 5. Fig. 6 furthermore illustrates rack profiles obtained after resharpening the cutter so often that its axis is set nearer to the pitch line 35 of the rack a distance 36—36' to obtain the given width of tooth space. For convenience the rack profiles obtained are shown in relation to the same position of the cutter axis.

Numeral 33' denotes the rack profile as it should be. Profile 33' is identical with profile 33 and simply shifted a distance 36—36' perpendicular to pitch line 35 of the rack.

The profile actually produced by an equidistant cutting edge is indicated in dotted lines 33". It can be demonstrated that the profile 33" produced by an equidistant cutting edge is a curve equidistant to the original rack profile 33. Its error is plainly apparent. In other words a cutter having relieved side surfaces of the character indicated in Fig. 5 produces different profiles at various stages of its life.

It is evident from the drawings (Fig. 6) that an equidistant cutting edge removes too much stock on the rack on both sides of the central portions of the rack profile (33"), and that a cutting edge conjugate to a rack profile (33') of constant form should stand back of an equidistant cutting edge on its outward portion as well as on its root portion.

A relieved side surface of a cutter suited to produce the same profile (33) is indicated in Fig. 7 in a view along the cutter axis. Profiles 41 and 42 of said surface in planes perpendicular to the cutter axis are indicated for characterizing said surface. Profile 41 is the same as profile 27 of Fig. 5. Profile 42 is however not a curve equidistant to profile 41, but recedes further from profile 41 on its outward portion, and also on its root portion, so that distance 44—44' is larger than distance 43—43'; and distance 45—45' is also larger than distance 43—43'.

The variable distance of profiles 41, 42, in a view along the cutter axis, implies that the tangential planes of the relieved side surface have varying inclinations with respect to the cutter axis. So the tangential plane at point 44 and the tangential plane at point 45 have larger inclinations with respect to the tool axis than the tangential plane at point 43.

Fig. 8 illustrates another form of rack profile, and Fig. 9 illustrates a relieved side surface of a cutter corresponding to the rack profile illustrated in Fig. 8, and to tooth surfaces conjugate to said rack profile. The profiles 54, 55 of a relieved side surface in two planes perpendicular to the cutter axis are seen to be curves of changing distance from each other, to enable the cutter to hold the shape of its product throughout its life. This again implies that the tangential planes of the relieved side surfaces have changing inclinations with respect to the cutter axis.

In accordance with the present invention, the generation of the relieved side surface of the character indicated in Fig. 7 or Fig. 9 is carried out in the manner that a cutter blank is moved relatively to an abrasive wheel having a plane working surface so that said plane working surface successively occupies the positions of the aforesaid tangential planes which include varying angles with the cutter axis. The plane working surface thereby envelops and generates a relieved side surface of the cutter.

Reference is now made to Figures 12–15, where numeral 58 denotes a cutter blank having an axis 59. Cutter 58 is shown in engagement with an abrasive wheel 60 provided with a plane working surface 61 and rotatable on an axis 62. Cutter 58 is indicated diagrammatically, only one of its cutting teeth 63 being shown. In the position Fig. 12 and Fig. 14 abrasive contact is made at a central portion including point 64 of a relieved side surface. Fig. 13 and Fig. 15 illustrate another position, where abrasive contact is made with the extreme outward portion including point 65 of said relieved side surface. It is noted that the angle included by the directions of the two axes 59 and 62 is different in the two positions illustrated.

Cutter 58 performs a translatory motion in a plane perpendicular to its axis and at the same time a turning motion on its axis. The said two motions have a predetermined changing ratio to each other, which depends on the profile to be produced. Abrasive wheel 60 is simultaneously oscillated relatively to the blank, on an axis 66 perpendicular to the plane of Fig. 12 and Fig. 13 and contained in the plane working surface 61. The aforesaid points 64, 65 also lie on axis 66. The oscillation on axis 66 is timed up with the other motions performed in a manner to be described hereafter.

Fig. 16 and Fig. 17 illustrate relative positions between an abrasive wheel 60 having a plane working face 61 and a cutter blank 68 containing cutting teeth (69) of substantially helical direction. Again the abrasive wheel is oscillated on an axis 66, while the cutter blank 68 performs a translatory motion and turning motion on its axis.

Fig. 18 and Fig. 19 illustrate a slightly modified arrangement insofar that the plane working surface (61) of an abrasive wheel is inclined in a different manner with respect to the paths of motion. While in Figures 12 to 15 the axis 62 of the abrasive wheel is parallel to the plane described by axis 59 of the cutter blank, the axis 70 of the abrasive wheel of Figures 18 and 19 is inclined to said plane by an angle equal to the inclination of the relieved side surface at a mean point. The abrasive wheel is oscillated relatively to the tool blank on an axis 66 which is here inclined to its plane working surface 61. The purpose of the arrangement illustrated in Fig. 18 and Fig. 19 is to spread wear of the abrasive wheel over a larger radial width, as can be demonstrated with the established methods. Practically the same shape of the relieved side surfaces may be produced in this manner, as in the manner described with respect to Figures 12 to 15.

Various other modifications may be devised, without however altering the general nature of the produced surfaces.

One profile of the relieved side surfaces depends only on the translatory motion of the cutter blank and on the turning motion on its axis, and is independent of the oscillation on axis 66. It is readily understood that this profile is the one generated by points of the axis 66 of oscillation, in the arrangements indicated in Figures 12 to 17. In the arrangement referred to in Figures 18 and 19 it is found to be the profile generated by points of the projection line of axis 66 to the plane working surface 61, provided that the oscillation is small.

The other portions of a relieved side surface depend on the nature of the oscillation on axis 66 as well.

For the sake of explanation I have attributed above some of the motions to the cutter blank and another motion, namely the oscillation on axis 66, to the abrasive wheel. In principle it is immaterial which motions are performed by the two elements, provided that the resulting relative motion is the same.

In practice I preferably attribute all the generating motions to the blank, so that the abrasive wheel performs only a rotary motion on its axis, outside of an adjustment for wear and for truing.

The principal novel elements of an abrading device constructed in accordance with the present invention will now be described with reference to Figures 20–26.

A cutter blank 71 is secured to a tapered arbor 72 which is fastened to a spindle 73 concentric with another spindle 74. Spindle 73 is disposed on the inside of hollow spindle 74 and rotatably mounted therein. The angular relation between the two spindles 73, 74 is controlled by an indexing mechanism of known character, which is enclosed in a casing 75, and which may be released in known manner for instance by a cable, omitted in the drawings, or by hand. Indexing is performed while the cutter blank is out of engagement with the abrasive wheel to be described hereafter. During the abrasive operation proper, the two spindles 73, 74 are locked together.

Spindle 74 is rotatably mounted in bearings 76, 77 of a structure 78, which is erected on a slide 79. Slide 79 is movable on an inclined plane 80 of a base 81. Slide 79 also engages a bar or arm 82 which is pivoted on an axis 83 perpendicular to plane 80.

In Fig. 21 slide 79 is shown in a different position as compared with Fig. 20 and in an angular position most convenient for drawing and explanation.

A grinding wheel 84 having a plane working surface 85 is mounted adjacent the cutter blank, in a known manner omitted in the drawings. Outside of adjustments, the grinding wheel is given solely a rotary motion on its axis, and does not perform any of the generating motions. The generating motions are all performed by the cutter blank. Otherwise the present device embodies the arrangement illustrated in Fig. 18 and Fig. 19. The translatory motion of the cutter blank in a straight path lengthwise of arm 82 is controlled by a cam device, consisting of a cam 86 secured to a projection 87 of spindle 74, and of an element 88 cooperating with cam 86 and secured to a projection 89 of arm 82. Cam 86 and element 88 are held in engagement by a spring 90.

The angularity of slide 79, and thereby the angular relation between the axis of the cutter blank and the axis of the grinding wheel 84, is controlled by another cam device, which consists of a cam 91 and a stationary element 92. Cam 91 is secured to a projection 93 of spindle 74, and element 92 is secured to base 81. A spring 94 maintains cam 91 in engagement with element 92. On account of the changing angularity of slide 79, the cam surface is given a circular profile. The cam surface may be made a spherical surface and the surface of element 92 engaged by said cam a cylindrical surface.

The angular position of slide 79 is changed through the difference in motion effected by the said two cam devices.

If so desired, slide 79 may be moved at a constant angularity by so choosing or adjusting the two cam devices, that they both effect the same translatory motion. In this manner the device described may also be used, if need be, for known purposes such as for grinding the relieved side surfaces of cutters for generating involute gears.

The generating mechanism is set in motion by oscillating spindle 74: A crank 95 is connected with a roller 96 by a flexible element 97, such as a wire rope, or a connecting rod having ball ends. Roller 96 is mounted on a pin of casing 75. Rotation of crank 95 oscillates casing 75 and spindle 74 connected therewith.

Element 97 is continuously maintained under tension through the weight of slide 79, which tends to move downwardly on inclined plane 80 and thereby tends to move roller 96 upwardly. If so desired additional means may be provided for increasing said tension, such as for instance spring means tending to draw slide 79 downwardly.

While I have omitted to indicate various adjustments, such as for varying the length of crank 95, or of element 97, and other adjustments, it is understood that this has been done merely to avoid unnecessary length and in an endeavor to confine my invention to a simplest form having an operative minimum of adjustments.

In Fig. 23 and Fig. 24 one of the above said cam devices is separately shown in two different positions. The cam device illustrated represents one of the many forms possible, and a form which is preferred for producing cutting tools for generating non involute interchangeable gears and for various other purposes.

Cam 86 has a circular profile 98 centered at point 99. Element 88 contains a concave circular profile centered at point 100. Cam 86 is adjustable on projection 87 of spindle 74. A screw 101 serves to tighten it in any suitable position. Element 88 also is adjustable. Its position may be changed by substituting other spacing blocks 102, 103 for the ones shown, and by then tightening the element in a manner not further illustrated. The various adjustments provided widen the adaptability of a cam device to many purposes.

The distance between centers 99 and 100 is equal to the difference of the radii of cam 86 and element 88 and is therefore constant for a given cam device having circular profiles. The distance between center 99 and the center 104 of spindle 74 is also constant, after the cam has been set to a given position. With these facts in mind it is understood that cam 86 and spindle 74 move relatively to element 88 in the same manner, as if cam 86 were connected by a linkage with element 88, the link in question extending from center 100 of element 88 to center 99 of cam 86. The equivalence of the motion effected by the cam device and of the motion obtainable with a simple linkage is found to be a conspicuous advantage in the mathematical treatment of the matter and in the selection of proper cams and cam settings.

The translatory motion effected by cam device 86, 88 has a changing ratio with respect to the turning motion of cam 86, adapted to the nature of the cutter blank.

The cam device consisting of cam 91 and stationary element 92 (Figures 25, 26) is often made of the same general structure as cam device 86, 88.

Sometimes, if the nature of the motions desired recommend it, I may use in place of element 92 an element having a convex circular profile, and embody said element as a roller rotatable on a stationary center.

Cam device 91, 92 controls the changing angularity of slide 79, and the two cam devices generally move slide 79 in a plane in such manner that the projection of the blank axis to said plane envelops a curved line in said plane. The blank axis itself also envelops a curved line.

A relieved side surface of a generating tool especially referred to may be determined as follows:

Two profiles of the relieved side surface are accurately determined, for instance two cutting profiles appearing on the tool at different stages of its life. Two cutting profiles, such as profiles 15, 15″ of Fig. 1, require different positions of the cutter axis with respect to the axis of a blank, and their shape in a view lengthwise of the cutter axis can be determined with the established methods of computation. If so desired the two cutting profiles may be mechanically determined, by actual generation. In this case the given profiles of the blank intended to be cut with the tool are embodied as cutting profiles. In Fig. 10 and Fig. 10a two teeth 110 of a blank portion 111 are indicated. The cutting profiles 112 are identical with the given tooth profiles of the blank, and the teeth 110 differ from finished teeth of the blank only by being relieved back of the cutting profiles 112. A cutting motion is provided by reciprocating a soft tool blank 113 lengthwise of its axis 114 or 114′. Axis 114 corresponds to the position of the axis of a tool containing the aforesaid profile 15; an axis 114′ corresponds to the position of a tool containing profile 15″. At the same time with the aforesaid reciprocation the tool blank 113 and blank portion 111 are turned slowly on their respective axes at the ratio corresponding to the respective numbers of teeth of the complete tool and of a finished blank.

In this manner a surface containing profile 15 is generated in the position Fig. 10; and a surface containing profile 15″ is generated in the position of the axes shown in Fig. 10a.

The cutting profiles (15 and 15″) themselves may be determined by intersecting the generated surfaces with the corresponding cutting faces.

After the profiles 15 and 15″ have been accurately determined, they are spaced apart axially a distance corresponding to a suitable relief, such as the distance of the two cutting faces 17 and 17″, Fig. 2. The relieved side surfaces desired are the surfaces enveloped or formed by planes which are tangent to both profiles 15 and 15″. In this manner surfaces of the character illustrated in Fig. 7 or Fig. 9 are obtained.

The task of the generating motions and mechanism of a cutter grinder is to move a cutter blank in such a manner relatively to the plane working surface of an abrasive wheel, that said plane surface successively occupies the positions of all the aforesaid tangential planes, that is to say of the planes which are tangent to both profiles (15 and 15″).

The motion effected or controlled by cam device 86, 88 is made such that the profile, whose shape only depends on cam device 86, 88, has a given shape, namely that it lies in a relieved side surface of the above said character. Often this profile coincides or nearly coincides with a mean cutting profile (15, 15′ or 15″) and in this case the motion controlled by cam device 86, 88 is made such (or nearly such respectively) that said cutting profile is generated by the motion controlled by said one cam device.

The other cam device, 91, 92, as aforesaid controls the angularity between the axis of the tool blank and the plane working surface of abrasive wheel 84. The angularities required can be accurately computed from the established shape of a relieved side surface.

When the profile controlled by cam device 86, 88 alone coincides or approximately coincides with a cutting profile (15, 15′ or 15″), as is the case in the machine illustrated in Figures 20 to 22, the motion to be effected by cam device 91, 92 may be obtained also in a mechanical manner; as can be demonstrated with the known methods of mathematics.

The surfaces generated on tool blank 113 as described with reference to Fig. 10 and Fig. 10a are coaxially mounted in such manner that the planes of symmetry 120 (Fig. 11) of two teeth 121, 122 coincide. They are then turned in unison on the common tool axis, in engagement with the straight sides 123, 124 of rack like elements 125, 126.

The two teeth 121, 122 impart different translations to the elements 125, 126. The difference as well as the individual amounts of translation of elements 125, 126 can be readily measured, and recorded for various turning angles of the teeth 121, 122.

Cam device 91, 92 should effect a translation differing from the translation effected by cam device 86, 88 a multiple of the difference between the translation of element 125 and the translation of element 126. The multiplication factor is equal to the ratio of the distance of pivot 83 (Fig. 20) from the central plane of cam 91, divided by the axial distance of the cutting profiles (15, 15″) from one another, or also the axial distance of the corresponding cutting faces (17, 17″, Fig. 2).

When proceeding in the aforesaid manner, computation may be reduced to a minimum.

Those skilled in mathematics will however in general prefer computation, which can be performed with the directions given.

Various changes and modifications may be made in my invention without departing from its spirit, by simply applying the current practice and established knowledge of the art.

For definition of its scope it is relied upon the appended claims.

What I claim is:

1. The method of forming relieved cutters, which consists in providing a cutter blank and a rotary tool, in rotating said tool in engagement with said blank on an axis angularly disposed to the axis of said blank, in turning said blank on its axis, and in providing additional motion between said blank and said tool at a changing rate with respect to said turning motion, whereby the angularity between the axis of the blank and the axis of said tool is changed.

2. The method of forming relieved cutters, which consists in providing a cutter blank and a rotary tool, in rotating said tool in engagement with said blank on an axis angularly disposed to the axis of said blank, in turning said blank on its axis, in providing translatory motion along a straight path between said blank and said tool in timed relation to said turning motion, and in changing the angularity between the axis of the blank and the axis of said tool.

3. The method of forming relieved cutters, which consists in providing a cutter blank and an abrasive wheel, in rotating said abrasive wheel in engagement with said blank on an axis angularly disposed to the axis of said blank, in turning said blank on its axis, and in providing additional motion between said blank and said abrasive wheel at a changing rate with respect to said turning motion, whereby the angularity between the axis of the blank and the axis of said abrasive wheel is changed.

4. The method of forming relieved cutters, which consists in providing a cutter blank and an abrasive wheel having a plane working surface, in rotating said abrasive wheel in engagement with said blank on an axis angularly disposed to the axis of the blank, in turning said blank on its axis, and in providing additional motion between said blank and said abrasive wheel at a changing rate with respect to said turning motion, whereby the angularity between the axis of the blank and the axis of the abrasive wheel is changed.

5. The method of forming relieved cutters, which consists in providing a cutter blank and an abrasive wheel having a plane working surface, in rotating said abrasive wheel in engagement with said blank on an axis angularly disposed to the axis of the blank, in turning said blank on its axis, in bodily moving said blank in a straight path in timed relation to said turning motion, and in changing the angularity between the axis of the blank and the axis of said abrasive wheel.

6. The method of forming relieved cutters, which consists in providing a cutter blank and an abrasive wheel having a plane working surface, in rotating said abrasive wheel in engagement with said blank on an axis angularly disposed to the axis of said blank, in turning said blank on its axis, in bodily moving said blank in a straight path at a changing rate as compared with said turning motion, and in changing the angularity between the axis of the blank and the axis of said abrasive wheel.

7. The method of forming relieved cutters, which consists in providing a cutter blank and an abrasive wheel having a plane working surface, in rotating said abrasive wheel in engagement with said blank on an axis angularly disposed to the axis of said blank, in turning said blank on its axis, in bodily moving said blank in a straight path in timed relation to said turning motion, and in changing the angularity between the axis of the blank and said plane working surface, said angularity being larger in forming the outward portion of a relieved side surface than in forming the central portion of said side surface.

8. The method of forming relieved cutters, which consists in providing a cutter blank and an abrasive wheel, in rotating said abrasive wheel in engagement with said blank, in turning said blank on its axis, in providing additional motion between said blank and said abrasive wheel in a manner that the axis of the blank describes a plane relatively to said abrasive wheel, the positions of the axis of the blank enveloping a curved line in said plane.

9. The method of forming relieved cutters, which consists in providing a cutter blank and an abrasive wheel, in rotating said abrasive wheel in engagement with said blank, in turning said blank on its axis, and in additionally moving said blank in a manner that the axis of said blank describes a plane and envelops a curved line in said plane.

10. The method of forming relieved cutters, which consists in providing a cutter blank and an abrasive wheel, in mounting said blank on a slide, in rotating said abrasive wheel in engagement with said blank, in turning said blank on its axis, and in moving said slide in a plane in timed relation to the turning motion of the blank in a manner that the projection of the blank axis to said plane envelops a curved line in said plane.

11. The method of forming relieved cutters, which consists in providing a cutter blank and an abrasive wheel having a plane working surface, in rotating said abrasive wheel in engagement with a relieved side surface of said blank on an axis angularly disposed to the axis of said blank, in turning said blank on its axis, and in providing additional motion between said blank and said abrasive wheel while changing the angularity between said plane working surface and the axis of the blank, said angularity being a minimum when abrasive contact is made with the central portions of a relieved side surface.

12. In a device for forming relieved cutters, an abrasive wheel, a slide for rotatably mounting a cutter blank, means for turning said blank on its axis, means for displacing said slide in a plane and for turning said slide in said plane, so as to change the angularity between the axis of the blank and the axis of said abrasive wheel, and an operative connection between the last named means and said blank.

13. In a device for forming relieved cutters, an abrasive wheel, a spindle for receiving a cutter blank, cam means for effecting linear and angular displacement between said spindle and said abrasive wheel so as to change the angularity between the axis of said blank and the axis of said abrasive wheel, an operative connection between said blank and said cam means, and means for imparting motion to the device.

14. In a device for forming relieved cutters, a mechanism comprising, an abrasive wheel, a spindle for receiving a cutter blank, means for supporting said spindle and said abrasive wheel, said means permitting linear and angular displacement between said spindle and said abrasive wheel so that the directions of the axis of said spindle and of the axis of said abrasive wheel may include varying angles with each other, two cam devices for establishing a definite relation between said linear displacement, said angular displacement and the turning angle of said spindle on its axis, and means for imparting motion to the mechanism.

15. In a device for forming relieved cutters, a mechanism comprising, an abrasive wheel, a spindle for receiving a cutter blank, means for supporting said spindle and said abrasive wheel, said means permitting linear and angular displacement between said spindle and said abrasive wheel so that the directions of the axis of said spindle and of the axis of said abrasive wheel may include varying angles with each other during the abrasive operation, means for establishing a definite relation between said linear displacement, said angular displacement, and the turning angle of said spindle on its axis in a manner that said linear displacement and said turning angle have a varying ratio with respect to each other, and means for imparting motion to the mechanism.

16. In a device for forming relieved cutters, a mechanism comprising, an abrasive wheel, a slide for rotatably mounting a cutter blank, means for supporting said slide and said abrasive wheel, said means permitting linear and angular displacement between said slide and said abrasive wheel so that the directions of the axis of the blank and of the axis of said abrasive wheel may include varying angles with each other during the abrasive operation, means for establishing a definite relation between said linear displacement, said angular displacement, and the turning angle of said blank on its axis in a manner that said linear displacement and said turning angle have a varying ratio with respect to each other, and means for imparting motion to the mechanism.

17. In a device for forming relieved cutters, an abrasive wheel, a spindle for receiving a cutter blank, a cam device for linearly displacing said spindle, another cam device for controlling the angle between the spindle axis and the direction of the axis of said abrasive wheel, the cams of said two cam devices being secured to said spindle, and means for imparting motion to the device.

18. In a device for forming relieved cutters, means for rotatably mounting an abrasive wheel, means for rotatably mounting a cutter blank, means for effecting turning motion of said cutter blank on its axis, guides for leading said cutter blank along a straight path, a cam device for timing up the displacement of said cutter along said straight path with said turning motion, and means for changing the angularity of said path with respect to the axis of said abrasive wheel in timed relation to the displacement of said cutter blank.

19. In a device for forming relieved cutters, means for rotatably mounting an abrasive wheel, a slide for rotatably mounting a cutter blank, means for effecting turning motion of said cutter blank on its axis, a cam maintained in constant relationship with said cutter blank during abrasive engagement for moving said slide along straight guides by cooperating with an abutment maintained in constant relationship with said guides, and means for changing the angularity of said guides with respect to the axis of said abrasive wheel in timed relation to the motion of said slide.

ERNEST WILDHABER.